June 7, 1960    F. D. JOHNSON    2,939,805
SELF-LOCKING BOLT AND METHOD OF MAKING SAME
Filed July 1, 1955

Inventor:
FREDERICK D. JOHNSON
by: J. Richard Cavanagh

United States Patent Office 2,939,805
Patented June 7, 1960

2,939,805
SELF-LOCKING BOLT AND METHOD OF MAKING SAME

Frederick Donald Johnson, Toronto, Ontario, Canada, assignor to The Imperial Flo-Glaze Paints Limited, Toronto, Ontario, Canada Filed July 1, 1955, Ser. No. 519,576

1 Claim. (Cl. 117—75)

This invention relates to a locking bolt and method of making same and more generally to a two-component fastening element having mutually engageable surfaces on said components and two discrete mutually polymerizable coatings between said surfaces adapted to be blended or otherwise mixed together during engagement of said surfaces to form a polymerized mass effectively locking said surfaces to provide a self-locking fastening element.

It is an object of the invention to provide a fastening device such as a bolt and nut combination having coatings on the threads thereof which are mutually polymerizable but normally separate and which under the shearing action of placing the nut onto the bolt, effect a blending of the coatings forming a polymerized bonding substance by mutual reaction between the coatings whereby to effect a locking of the bolt to the nut.

While this disclosure sets forth a preferred embodiment of the invention as applied to a bolt and nut class of fastening element, it will be appreciated that the invention is of much wider application and is submitted as generic to the locking of fastening devices of the two-component class wherein the components have mutually engageable surfaces effecting the fastening function.

With this and other objects in view, the invention will be appreciated in more detail by reference to the accompanying drawings illustrating by way of example, an application of the invention to a bolt and nut class of fastening device.

Figure 1:
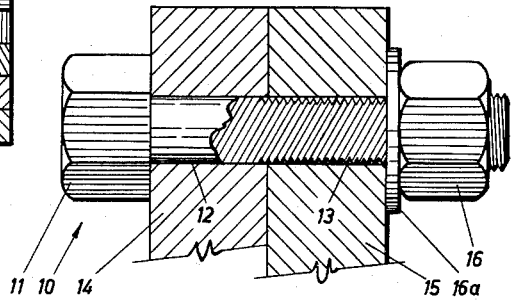
Figure 2:
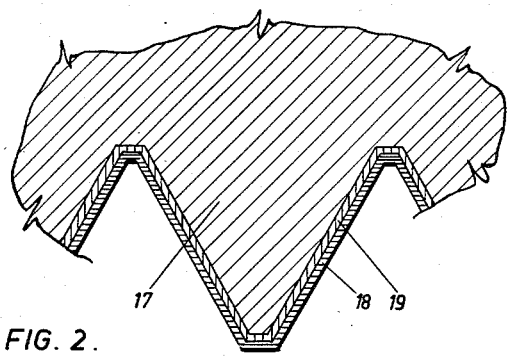
Figure 3:
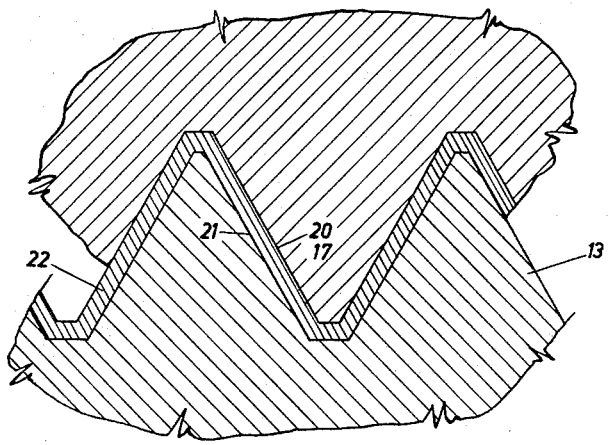

In Figure 1, a self-locking bolt and nut of the invention is shown applied to the fastening of two plates;

Figure 2 is an enlarged sectional view of engaging surfaces or threads of one of the components of the fastening device of Figure 1; and Figure 3 illustrates the formation of a polymerized substance according to the invention between the mutually engaging surfaces of the fastening device of Figure 1.

Referring to the drawings, a bolt 10 having a head 11, shank 12 and threads 13 thereon passes through the plates 14 and 15 to effect clamping thereof by means of the threaded nut 16 acting against washer 16a.

As shown in Figure 2, the threads 17 for example of nut 16 carry thereon the coatings 18 and 19 deposited thereon by any suitable well-known method such as by spraying, dipping and the like. The coatings may cover all of the thread surfaces or a portion thereof.

The coatings 18 and 19 according to the invention are adapted to form a polymerized mixture and when mixed, preferably form a metal-to-metal adhesive. When the nut 16 is threaded onto the threads 13 of the shank 12, the shearing action of the mutually engaging surfaces 20 and 21 of the opposed threads effects a mixing of the coatings 18 and 19 forming a polymerized substance 22 which, in a relatively short period of time, depending upon the composition of the materials employed, effects a secure locking of the nut to the bolt. It is the shearing action of the mutually engaging surfaces of the components of the locking device which effects the mixing of the coatings. In view of the wide choice of substances which may be suitable for the formation of a fastening device of the invention, it is desired to set forth two typical examples, as follows:

Example 1

One coating may consist of a soft tacky polymer formed by condensation of a mixture of dimerized and trimerized unsaturated vegetable oil fatty acids with diethylene triamine. Skilled persons will recognize such a susbtance as a polyamide; a substance used in the present example is known by the name Polyamide 100, a product of General Mills Inc.

The other coating in this example consists of a soft tacky resin made by condensing epichlorhydrin with bisphenol. Such materials are recognized by skilled persons under the general term of epoxy resins. One suitable resin used in the present example is known by the name of Epon 834, a product of Shell Chemical Corporation.

The above noted epoxy resin was heated to a liquid form and a threaded bolt shank dipped into it to form a single coating. Upon cooling, the coating of polyamide was placed thereon by first dissolving the polyamide in methyl isobutyl carbinol, this solvent being non-solvent for the epoxy coating. The bolt carrying the first coating was then dipped into the polyamide in solvent to form a thin polyamide coating thereover. A polymeric membrane film was substantially immediately formed between the two coatings by reason of the fact that they were mutually reactive. Because the coatings in this example did not bleed into one another or were non-migratory, they remained physically separated by the polymeric membrane formed therebetween until brought into general contact by mixing thereof accomplished by the pressure and shearing action of screwing the nut onto the threads of the bolt. The mixing action so accomplished resulted in a ready formation of a polymerized substance effectively locking the nut onto the bolt.

Example 2

One coating was formed by reacting 5 mols of totylene diisocyanate with 1 mol of trimethylol propane and 1 mol of 1,4 hexane diol. A 70% solids solution in ethyl acetate was made with this material and a coating on a threaded bolt shank made by dipping the shank therein. The coating was allowed to dry and thereafter a coating of alkyd resin having an excess of OH groups was applied. The alkyd resin employed was made by reacting 3 mols of phthalic anhydride with 4.1 mols of trimethylol propane until an acid number of less than one was achieved. The alkyd resin was applied over the first coating by a dipping method as before.

It will be apparent that the foregoing examples disclose that a polymerized bonding substance between engaging surfaces of a fastening element may be accomplished by applying mutually reactable ingredients of a polymerized bonding body to be formed, as coatings between engaging surfaces of a fastening element whereby the coatings upon engagement of the engaging surfaces become mixed for reaction to form the polymerized bonding body. Any two mutually polymerizable substances adapted upon mixing to form a polymerized body and adapted to be mixed under the pressure of bringing fastening element engaging surfaces substantially into engagement, are generally suitable materials for purposes of the invention. Suitability is dependent more upon the physical characteristics of the substances to be employed having regard to the fact that there are such a wide range of chemical substances which would be suitable. In the chemical sense, a practical limitation such as the effect of air, humidity, ageing and reacting time for polymerization, are characteristics, the specifications of which for the purposes set forth will readily be appreciated by skilled persons. It should be noted that the coated fastening element of the invention in the preferred form, will embody a coating thereon which resists corrosion having regard to the corrosion resistance properties of most polymerizable substances as contemplated herein.

What I claim as my invention is:

A self locking bolt adapted upon threading into a receiver having thread surfaces such as a nut to be locked thereto by a plastic polymerized substance and comprising in combination: a bolt structure including a threaded shank; a polyamide coating on said threaded shank; and an epoxy resin coating on said shank adjacent said polyamide coating and polymerizable with the polyamide coating upon mixing therewith, said coatings being adapted to protect said threaded shank during storage and upon mixing effectable by threading of said bolt into said receiver to polymerize to form said substance locking said bolt in said receiver.

References Cited in the file of this patent

UNITED STATES PATENTS

| | | |
|---|---|---|
| 1,497,952 | Smith | June 17, 1924 |
| 2,199,597 | Renfrew et al. | May 7, 1940 |
| 2,321,414 | Parker | June 8, 1943 |
| 2,403,077 | Hershberger | July 2, 1946 |
| 2,489,145 | Lieb et al. | Nov. 22, 1949 |
| 2,517,778 | Fischer | Aug. 8, 1950 |
| 2,596,136 | Ernst | May 13, 1952 |
| 2,631,947 | Kline | Mar. 17, 1953 |
| 2,633,432 | Kenneway | Mar. 31, 1953 |
| 2,705,223 | Renfrew et al. | Mar. 29, 1955 |
| 2,709,664 | Evans | May 31, 1955 |
| 2,765,288 | Whittier et al. | Oct. 2, 1956 |
| 2,817,620 | Golich et al. | Dec. 24, 1957 |

FOREIGN PATENTS

| | | |
|---|---|---|
| 435,041 | Great Britain | Sept. 12, 1935 |